(12) United States Patent
Canioni et al.

(10) Patent No.: US 10,580,323 B2
(45) Date of Patent: Mar. 3, 2020

(54) HYBRID SIMULATOR AND METHOD FOR TEACHING OPTICS OR FOR TRAINING ADJUSTMENT OF AN OPTICAL DEVICE

(71) Applicants: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); INSTITUT NATIONAL DE RECHERCHE EN INFORMATIQUE ET EN AUTOMATIQUE, Le Chesnay (FR)

(72) Inventors: Lionel Canioni, Gradignan (FR); Martin Hachet, Bordeaux (FR); Jean Paul Guillet, Talence (FR); Bruno Bousquet, Leognan (FR); David Furio, Talence (FR)

(73) Assignees: UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); INSTITUT NATIONAL DE RECHERCHE EN INFORMATIQUE ET EN AUTOMATIQUE, Les Chesnay (FR)

( * ) Notice: Subject to any disclaimer, the term of this patent is extended or adjusted under 35 U.S.C. 154(b) by 242 days.

(21) Appl. No.: 15/740,367

(22) PCT Filed: Jun. 24, 2016

(86) PCT No.: PCT/EP2016/064680
§ 371 (c)(1),
(2) Date: Dec. 28, 2017

(87) PCT Pub. No.: WO2017/001300
PCT Pub. Date: Jan. 5, 2017

(65) Prior Publication Data
US 2018/0315344 A1 Nov. 1, 2018

(30) Foreign Application Priority Data

Jun. 29, 2015 (EP) .................................... 15306026

(51) Int. Cl.
*G09B 23/22* (2006.01)
*G09B 5/00* (2006.01)

(52) U.S. Cl.
CPC ............... *G09B 23/22* (2013.01); *G09B 5/00* (2013.01)

(58) Field of Classification Search
CPC .................................. G09B 23/22; G09B 5/00
See application file for complete search history.

(56) References Cited

U.S. PATENT DOCUMENTS

| 3,962,802 A | 6/1976 | Kane |
| 4,033,052 A | 7/1977 | Failes |
| (Continued) | | |

FOREIGN PATENT DOCUMENTS

DE 14 47 320 A1 1/1994

OTHER PUBLICATIONS

John Underkoffler et al.: "Illuminating Light: An Optical Design Tool with a Luminous-Tangible Interface", Published in the Proceedings of CHI '98, Apr. 18-23, 1998, 1998 ACM, MIT Media Laboratory Cambridge, MA.
(Continued)

*Primary Examiner* — Corbett B Coburn
(74) *Attorney, Agent, or Firm* — Young & Thompson

(57) ABSTRACT

Disclosed is a hybrid simulator for teaching optics or for training adjustment of an optical device. The hybrid simulator includes at least one dummy optical component physically simulating an optical device, at least one actuator device for generating or simulating an adjustment of the dummy optical component, a sensor configured for detecting
(Continued)

an adjustment signal representative of operating the actuator device, a digital processing system including a numerical model for simulating an output numerical optical beam resulting from interaction between an input numerical optical beam and a numerical optical component representing the optical device as a function of the adjustment signal and a display system for displaying a visual signal representative of the output optical beam and/or augmented reality signals.

20 Claims, 3 Drawing Sheets

(56) References Cited

U.S. PATENT DOCUMENTS

| | | | |
|---|---|---|---|
| 5,282,014 A | 1/1994 | Ruhl et al. | |
| 2005/0197809 A1* | 9/2005 | Dowski, Jr. | G02B 27/0012 703/6 |
| 2006/0256315 A1* | 11/2006 | Sato | G03B 27/72 355/69 |

OTHER PUBLICATIONS

International Search Report, dated Sep. 5, 2016, from corresponding PCT/EP2016/064680 application.

* cited by examiner

HYBRID SIMULATOR AND METHOD FOR TEACHING OPTICS OR FOR TRAINING ADJUSTMENT OF AN OPTICAL DEVICE

TECHNICAL FIELD OF THE INVENTION

The invention relates to a simulator for teaching or training purposes in the field of optics and photonics.

More precisely the invention relates to a system and a method for teaching optics or for training adjustment of at least one optical, opto-mechanical and/or optoelectronics component in an optical bench.

BACKGROUND INFORMATION AND PRIOR ART

In the field of education, experiments in optics are essential for students to understand physical phenomena such as spectroscopy, interferometry, laser beam propagation . . . . However, mounting an optical bench requires many high tech optical, opto-mechanical and opto-electronic components. Optical components such as lenses or mirrors are generally fragile and require a rather clean environment. An optical bench is thus expensive and time consuming for both construction and maintenance. Moreover, experiments in optics are potentially hazardous due to the use of laser light sources.

In the field of manufacturing complex optical or opto-electronics systems such as lasers or microscopes, training production-line operators is necessary to achieve careful alignment of the optical, opto-mechanical and opto-electronic components. Moreover, due to rapid evolution in these high tech products, new adjustment methods are also required in the manufacturing environment. Because ready-made optical benches for teaching specific optical or opto-electronic systems are not available, a production system is usually taken from production line for the duration necessary to training. This immobilization is expensive and returning a system to the production line requires additional readjustments.

An alternative to physical optical benches or real opto-electronic systems is to run purely numerical models instead of real life experiments. Many software applications are now available for design and simulation of numerous optical or illumination systems. These numerical models are capable of simulating geometrical optics, imaging systems, coherent laser and fiber optic systems. However, these simulations rely on ideal numerical models and, consequently, the simulated result can be far from reality. Moreover, these numerical models are also complex to use and do not provide the same sensorial interactions to students or operators as compared to a real life optical bench.

In the publication "Illuminating light: an optical design tool with a luminous-tangible interface", Proc. CHI '98, ACM Press. p 542-549, 1998, J. Underkoffler and H. Ishii describe a mock holographic recording setup comprising plastic objects representing optical components, a camera for tracking position of the plastic objects and a projector for projecting a simulated optical beam path. The planar simulated beam path is updated depending on inputs from the camera. However, this system does not reproduce a true optical setup.

SUMMARY OF THE INVENTION

Therefore one object of the invention is to provide a system and method enabling easy, precise, interactive, cheap and safe teaching and training in the field of optics and photonics.

The above objects are achieved according to the invention by providing a hybrid simulator for teaching optics or for training adjustment of an optical device.

In the present disclosure, the term optical device encompasses an optical component or optical system, an opto-mechanical device or an optoelectronics device.

Within the present disclosure the term adjustment of an optical device means adjusting at least one physical parameter value liable to affect the optical properties of this optical device. This term encompasses for example adjusting the position and/or orientation of an optical device, adjusting the electrical current-voltage applied to an opto-electronic component and even adjusting an environmental parameter such as temperature and/or pressure applied to an optical device, for example so as to control the emission wavelength of a diode laser or modify the refractive index of an optical device.

According to the invention, the hybrid simulator comprises at least one dummy optical component physically simulating an optical device, at least one actuator device for generating or simulating an adjustment of said dummy optical component; a sensor configured for detecting an adjustment signal representative of operating said actuator device; a digital processing system receiving said adjustment signal from said sensor, said digital processing system comprising a numerical model for simulating at least an output numerical optical beam resulting from interaction between an input numerical optical beam and a numerical optical component representing said optical device as a function of said adjustment signal; a display system for displaying a visual signal representative of said output numerical optical beam as a function of said adjustment signal.

In this hybrid simulator, a true optical device is replaced by a combination of a dummy optical device and a numerical optical device. The dummy optical device represents the true optical device in the real part of the hybrid simulator and the corresponding numerical optical device represents the true optical device in the numerical part of the hybrid simulator. A numerical optical device may represent numerically any an optical component, optical system, opto-mechanical device or optoelectronics device. The actuator enables physical interaction with the real part of the hybrid simulator while the sensor feeds the numerical model with real measurements.

This hybrid simulator provides physical interaction with tangible and visual feedback sensations which are very similar to those of an experiment relying on true optical, opto-mechanical and/or optoelectronics devices in a true optical system or optical bench.

The hybrid simulator has an unlimited flexibility and can be adapted to simulate numerous optical setups.

Implementing a hybrid simulator is easy and requires no costly optical, opto-mechanical or optoelectronics component.

According to a particular embodiment, said actuator device comprises a translation and/or rotation stage attached to said dummy optical component for translating and/or rotating said dummy optical component and said sensor is configured for detecting a translation and/or rotation signal of said translation and/or rotation stage.

According to a particular embodiment, said actuator device comprises an adjustment screw and/or an electric actuator for simulating translation and/or rotation of said dummy optical component, said actuator device having preferably micrometric or sub-micrometric precision, and said sensor is configured for detecting a translation and/or rotation signal of said adjustment screw and/or said electric actuator.

According to another particular embodiment, said actuator device comprises an electric, electronic, opto-mechanic or optoelectronic actuator for generating or simulating an electric, electronic, opto-mechanic or optoelectronic adjustment of said dummy optical component and said sensor is configured for detecting an adjustment signal of said electric, electronic, opto-mechanic or optoelectronic actuator.

According to a particular aspect of the invention, said actuator device is configured for generating or simulating an adjustment in temperature and/or pressure of said dummy optical component and said sensor is configured for detecting a temperature and/or pressure adjustment signal.

According to a particular aspect of the invention, the hybrid simulator further comprises wired or wireless communication system for transferring said adjustment signal from said sensor to said digital processing system.

According to another particular aspect of the invention, said display system comprises a video-projector, an electronic screen or a tablet for displaying said visual signal representative of said output numerical optical beam as a function of said adjustment signal representative of operating said actuator device.

According to a particular and advantageous aspect of the invention, said digital processing system and said display system are configured for displaying augmented reality signals.

Preferably, the hybrid simulator further comprises another video-projector, another computer screen or another tablet for displaying augmented reality signals, comprising a visual optical beam path simulating said input numerical optical beam and/or said output numerical optical beam relatively to said dummy optical component and/or visual guiding signals.

According to a particular aspect of the invention, the hybrid simulator for teaching optics or for training adjustment of an optical device further comprises a 3D-tracking system for tracking position and/or orientation of said dummy optical component in three dimensions.

According to a particular aspect of the invention, said numerical optical component represents an optical component chosen for example among a non exhaustive list including convergent and divergent lenses; plane, convex and concave mirrors; thin polarizers; birefringent polarizing prisms; beam-splitters; wave-plates; spatial filters; spectral filters; optical gain media; amplitude and phase modulators; acousto-optic and electro-optic crystals; nonlinear optical crystals. Any of these optical devices may comprise a thin film coating.

According to a particular aspect of the invention, the hybrid simulator further comprises a numerical database of numerical optical components enabling simulation of a plurality of optical, opto-mechanical or optoelectronics devices and/or optical systems.

According to a particular aspect of the invention, the hybrid simulator comprises a plurality of dummy optical components physically simulating a plurality of optical, opto-mechanical and/or optoelectronics components, each dummy optical component having an identification tag, and wherein each identification tag is associated with a determined numerical optical device in the numerical database.

According to a particular aspect of the invention, said numerical model comprises beam propagation modeling according to an numerical model based on any one or a combination of geometrical optics, physical optics including scalar and vector models, laser physics, Gaussian beam propagation, and nonlinear optics.

The invention also proposes a method for teaching optics or for training adjustment of an optical device, the method comprising the steps:
  placing at least one dummy optical component in an initial configuration in a hybrid simulator, said dummy optical component physically simulating an optical device;
  physically adjusting at least one actuator device so as to generate or simulate an adjustment of said dummy optical component;
  detecting an adjustment signal representative of operating said actuator device;
  transmitting said adjustment signal to a digital processing system;
  numerically simulating an output numerical optical beam resulting from interaction between an input numerical optical beam and a numerical optical component representing said optical device as a function of said adjustment signal;
  displaying a visual signal representative of said output numerical optical beam as a function of said adjustment signal.

According to specific aspects, the method further comprises the steps of:
  Providing a database of optical transfer functions associated with numerical optical components, wherein each dummy optical component is uniquely associated with an optical transfer function stored in said database;
  Providing an identification tag attached to a dummy component, said identification tag being associated with a determined optical transfer function stored in said database; and/or
  Displaying augmented reality signals.

BRIEF DESCRIPTION OF THE DRAWINGS

This description is given for non limiting illustrative purposes only and will be better understood when referring to the annexed drawings wherein.

DETAILED DESCRIPTION OF EXAMPLE(S)

Device

Figure 1:
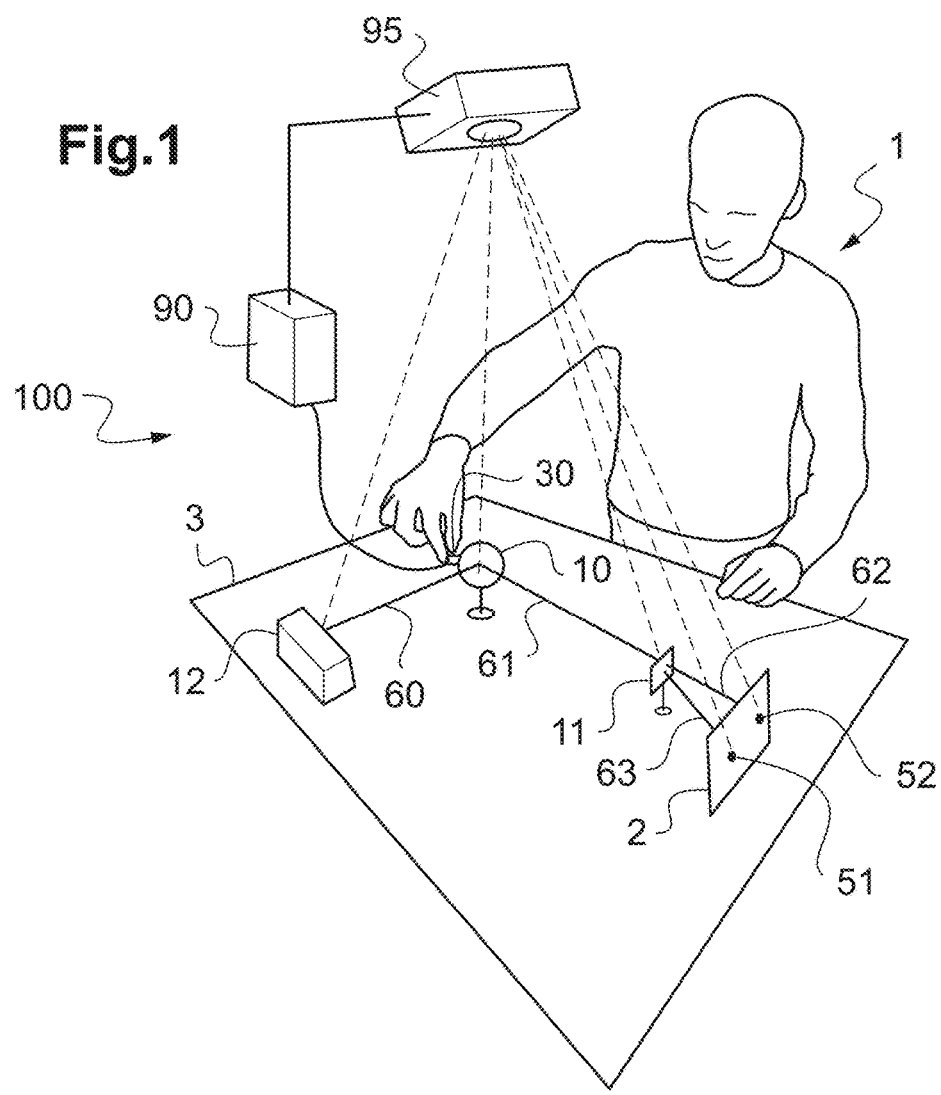
FIG. 1 represents a first embodiment of hybrid simulator according to the invention.

FIG. 1 schematically represents a hybrid simulator 100 configured for simulating an experimental setup in the field of optics and optoelectronics. Within the present disclosure the term hybrid simulator means a system combining physical components to be adjusted by an operator, a numerical processing system and a display device, such as a screen or a video-projector, for displaying visual output signals.

More precisely, the hybrid simulator comprises dummy optical components replacing the true optical components of a conventional optical bench.

In the example of FIG. 1, the hybrid simulator 100 comprises a dummy light source 12, a dummy mirror 10 and a dummy prism 11 placed on top of a table 3. The hybrid simulator 100 also comprises a computer system 90 and a display system comprising a video-projector 95 and a physical screen 2. The video-projector 95 is configured for projecting visual signals on the surface of a physical screen 2 and/or on the surface of the table 3. As an example, the physical screen 2 is made of a flat cardboard placed perpendicularly to the top of the table 3.

Alternatively, the display system comprises two video-projectors. For example, a first video-projector is placed and configured so as to project an image on the physical screen 2 and a second video-projector is placed and configured so as to project another image from the top on the surface of the table 3. Other display systems comprising more than two video-projectors are also contemplated within the frame of the present disclosure.

In another embodiment, the display system comprises a computer screen, a tablet or a smartphone.

Each dummy optical component represents a true optical device or a true optical system. The main function of a dummy optical component is to represent the physical position and/or orientation of a true optical component. However, a dummy optical component does not present any true optical surface. The dummy optical components are passive components as regards real optical function.

Dummy optical components can be made of cheap materials such as carbon-based material. Dummy optical components may have a geometrical shape, such as a parallelepiped. Alternatively, a dummy optical component has a shape similar to that of a true optical component attached to a mount, a post and/or a base. Dummy optical components can be manufactured by 3D-printing for representing replica based approximately on the outer shape of a true optical component. Dummy optical components can be grasped by the operator without risk of damaging any true optical surface. The cost of a dummy optical component is extremely low compared to the cost of a true optical component.

Contrary to a conventional optical bench, that generally requires a high performance optical breadboard for providing a flat and vibration-free surface, the hybrid simulator 100 is arranged on a simple table 3 supporting the dummy optical components. The dummy optical components can even be placed on separate tables, since the dummy optical components are passive components and thus are not sensitive to mechanical vibrations.

As shown on FIG. 1, an actuator is placed so as to simulate an adjustment in translation and/or rotation of at least one dummy optical component. For example, the adjustment screw 30 is placed next to the dummy mirror 10 so as to simulate a true mirror mounted on a tilt stage having a similar adjustment screw for adjusting the angular tilt of the true mirror. An operator 1 hand-operates the adjustment screw 30 next to the dummy mirror 10 in a similar way as for adjusting the tilt angle of a true mirror attached to a tilt stage. However, in the hybrid simulator, the dummy optical component does not necessary undergo a real angular tilt when the adjustment screw 30 is rotated.

Preferably, the adjustment screw 30 is the same as a conventional adjustment screw used in an optical bench so as to provide sensitive position and/or orientation adjustment with a micrometric or sub-micrometric precision. As illustrated on FIG. 1, the operator 1 adjusts manually the adjustment screw 30 simulating an adjustment of the orientation of the dummy mirror 10, with a similar manual sensitivity and with the same precision as in a conventional optical bench equipped with the same adjustment screw.

The adjustment screw 30 is equipped with a sensor detecting a rotation signal of the adjustment screw 30. The sensor comprises a transducer connected to a computer 90. Thus, the computer system 90 receives the instantaneous signal measured by the sensor. A calibration procedure enables to transform the raw measured signal into a signal representative of a virtual tilt angle of the dummy mirror. For example, a full turn of the adjustment screw corresponds to a virtual tilt angle of 1 degree. Thus, the computer acquires a signal representative of an angular tilt as a function of the hand-operated manipulation of the adjustment screw 30.

Preferably, the sensor is placed close to the adjustment screw 30 or even embedded with the adjustment screw 30 so as to detect a precise signal representative of an action of the operator on the adjustment screw 30.

The computer system 90 comprises a numerical model simulating the optical setup of the hybrid simulator. Whatever the optical setup, the numerical model is always based on common physical models involving geometrical optical beam propagation, diffraction, interferences and polarization. Depending on the assumptions made, the numerical model represents the optical setup in a virtual 2D or 3D environment. The reference full-virtual tool exploited to design optical setups is Zemax (http://www.zemax.com) which includes classical physical models described in optics courses.

The numerical model simulates a numerical optical component having a determined optical function associated with each dummy optical component as a function of the position and orientation of each dummy optical component.

In the first example, the numerical model comprises a numerical light source defined by its spectrum, aperture, propagation properties and polarization state. This numerical light source simulates numerically a light source which physical replica is represented by the dummy light source 12. The numerical model comprises a numerical flat mirror having a numerically adjustable tilt angle, represented by the dummy mirror 10 and the adjustment screw 30. The numerical model comprises a numerical Wollaston prism, whose physical replica is represented by the dummy prism 11. Finally, the numerical model comprises a numerical projection screen, representing the physical screen 2.

The respective positions and orientations of the numerical light source, numerical mirror, numerical prism and numerical projection screen are initialized. Here, the positions of the numerical light source, numerical prism and numerical projection screen are supposed to be fixed. Hence, the numerical model monitors only the rotation of the adjustment screw 30 as measured by the sensor, this rotation signal representing a tilt angle of the dummy mirror 10.

The numerical model simulates emission of a numerical light beam by the numerical light source and reflection of this numerical light beam on the numerical mirror. The numerical model simulates formation of a numerical reflected beam at the output of the numerical mirror and transmission of the numerical reflected light beam through the numerical prism, which generates two numerical output beams as a function of polarization state, angle of incidence and/or wavelength. Finally the numerical model simulates projection of the two numerical output beams on the numerical projection screen. The numerical model simulates numerical optical beam paths, numerical beam position in a determined plane transverse to the numerical optical beam path and/or optical intensity of the simulated light beams.

More specifically, the numerical model computes dynamically the numerical angle of reflection of the numerical light beam on the numerical mirror as a function of the signal representative of an angular tilt derived from the measured rotation signal of the adjustment screw 30. As a result, the numerical model computes dynamically the numerical position and/or intensity of the numerical reflected light beam and of the two numerical output beams producing two numerical beam spots on the numerical projection screen.

For example, the numerical model computes a numerical image representing the simulated position and/or intensity of the two numerical beam spots on the numerical projection screen.

The computer system 90 is connected to a video-projector 95. The video-projector 95 receives the numerical image of the two numerical beam spots from the computer system and projects a real image representing this numerical image as two displayed beam spots 51, 52 on the physical screen 2. The respective positions and/or intensities of the two displayed beam spots 51, 52 projected on the screen 2 are updated dynamically as a function of the measured rotation of the adjustment screw 30.

Thus, the operator 1 visualizes dynamically the relative positions and/or intensities of the displayed beam spots 51, 52 as a function of the measured rotation representing a virtual tilt angle of the dummy mirror 10. The operator 1 experiences tactile and visual feedback sensations, which are very similar to those of an experiment relying on true optical components.

Besides, the numerical model generally computes dynamically the numerical optical beam path from the numerical light source to the numerical projection screen.

As an option, the computer system 90 and the video-projector 95, or another video-projector, generate a numerical image representing this optical beam path. As illustrated on FIG. 1, the video-projector 95 receives the numerical image of the optical beam path and projects a real image representing this numerical image of optical beam path on the surface of the table 3. The video-projector 95 projects: the image of the beam path 60 from the dummy light source 12 to the dummy mirror 10, the image of the reflected beam path 61 from to the dummy mirror 10 to the dummy prism 11, the image of the split beam paths 62, 63 from the dummy prism 11 to the physical screen 2. Since the numerical model updates dynamically the tilt angle of the dummy mirror 12 as measured by the sensor, the images of the beam paths 61, 62, 63 downstream the dummy mirror 10 are updated dynamically.

Thus, the operator 1 visualizes dynamically the intermediate beam paths 61, 62, 63 as a function of the rotation of the adjustment screw 30 as measured by the real sensor. In the case where the dummy mirror 10 is extremely misaligned, so that the numerical optical beam passes outside the numerical prism, the position of the intermediate beam path 61 represented the beam reflected by the dummy mirror can help the operator find the correct direction in which turning the adjustment screw 30 so as to correct rapidly the alignment error. Displaying the intermediate beam paths 61, 62 and 63 provides tutorial informations. Other tutorials informations may be displayed, such as arrays indicating the direction of movement to reach a predetermined alignment position, or numbers indicating the intensity of a beam spot, and also the polarization state of each beam.

Thanks to these additional displayed informations, the operator 1 has easier understanding of the physical optical phenomena involved. Moreover, the operator 1 achieves optical alignment of the dummy mirror 10 in a shorter time.

As an option, the video-projector 95 is combined with a camera system for optically tracking the position and/or orientation of one or several dummy optical component(s). To that end, a tracking label is preferably attached to the optical component to be tracked. The informations from the camera system are transferred to the computer system 90 as a complement to informations from the sensor(s). Thus, the computer system computes dynamically the position(s) and/or orientation(s) as a function of measured signal(s) from the sensor(s) and as a function of tracking signals from the camera system.

Alternatively, each dummy optical component has an RFID identification tag and an RFID tracking system enables detecting automatically the different dummy optical component. Preferably, each RFID identification tag is stored in a database and linked to a determined optical transfer function numerically simulating a determined optical device.

The hybrid simulator 100 can be easily reconfigured without modifying the physical layout or with minimal changes.

For example, a change in light source wavelength is easily operated by changing the corresponding numerical light source wavelength in the numerical model, without any change in the physical layout.

The optical function associated with an optical component can easily be changed, without necessary changing the dummy optical component. For example, in a first simulation, the dummy mirror 10 represents a flat mirror. In other simulations, the numerical flat mirror can be replaced by a spherical mirror or a semi-transparent plate for simulating a different optical setup. Similarly, the dummy prism 11 represents in a first simulation a Wollaston prism having a determined angle, birefringence and crystal orientation. In other simulations, the features of the numerical prism can easily be modified and/or the Wollaston prism can be replaced by another type of prism.

Moreover, one or several additional numerical component(s) can be added in the numerical model to simulate a particular optical function associated to this additional numerical component. Such an additional numerical component may or may not be represented by an additional dummy optical component. For example, an additional numerical component simulating a polarizing filter or a spectral filter can be inserted in the numerical model to simulate the effect of such a filter in a determined position on the optical beam path, for example on the optical beam path upstream or downstream from the numerical prism.

Conversely, a numerical optical component representing a dummy optical component can be removed from the numerical model for simulation purposes, with or without removing the corresponding dummy optical component.

The flexibility and adaptability of the hybrid simulator are thus incomparable relatively to the limited resources available using a conventional optical bench.

In the first embodiment described in relation with FIG. 1, the operator 1 actuates only one actuator simulating adjustment of a dummy optical component. However, the hybrid simulator is designed so that modules can be used or added as necessary.

As concerns the physical layout, the number of dummy optical components to be adjusted can be increased.

As concerns the numerical modelling, the numerical model employed for simulating the optical setup can be based on more complex numerical models for designing laser systems, fiber optic systems, optoelectronic systems based on non-linear effects such as second harmonic generation or sum-frequency generation.

As concerns the visual simulation, the display system comprising one or several video projectors can be replaced by or mixed with one or several computer or tablet screens displaying the simulated optical output signals, visual guiding signals and/or tutorial informations.

The sequence according to which different simulated signals are displayed is preferably configured in advance, depending on the learning level of the operator.

FIGS. 2-5 represent another example embodiment of hybrid simulator representing a Michelson interferometer. Adjusting a true Michelson interferometer is a conventional experiment for students in the field of optics. However, the adjustments of true optical components can be difficult to achieve, and the difficulties in achieving a proper alignment may arise from multiple origins.

Figure 2:
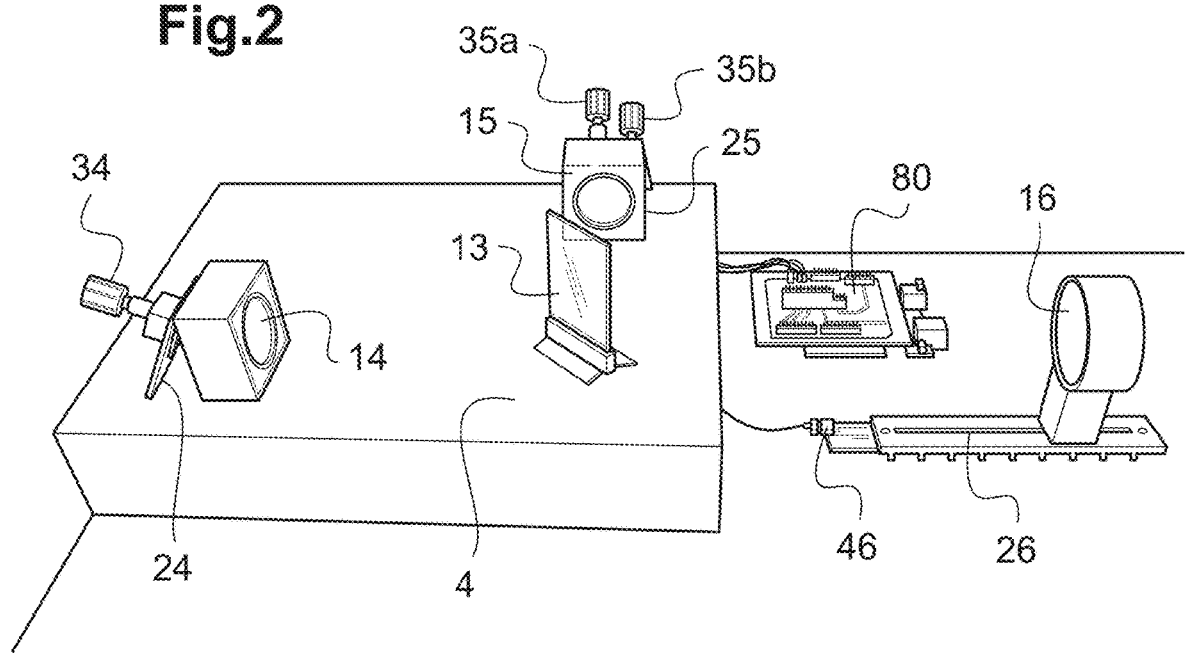
FIG. 2 represents a first view of second embodiment of hybrid simulator according to the invention.
Figure 3:
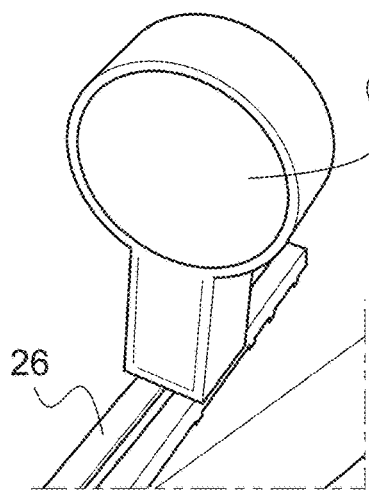
FIG. 3 represents a dummy optical component attached to a translation stage.
Figure 4:
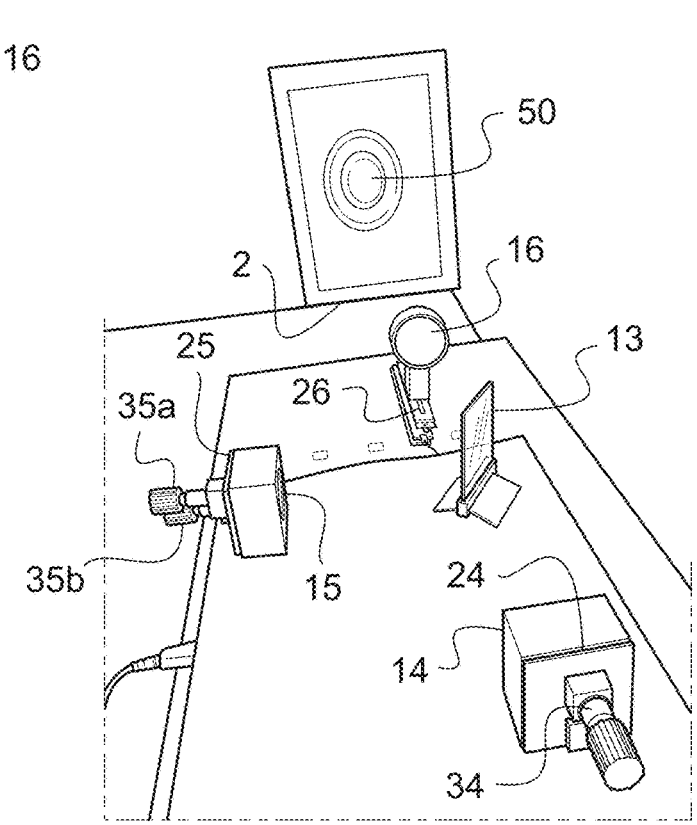
FIG. 4 represents a second view of the second embodiment of hybrid simulator according to the invention.

As illustrated on FIGS. 2 and 4, the hybrid simulator comprises a dummy beam splitter 13, a first dummy mirror 14 simulating the end of the first arm of the Michelson interferometer, a second dummy mirror 15 simulating the end of the second arm of the Michelson interferometer, and a dummy convergent lens 16. The hybrid simulator may comprise or not a dummy light source (not represented).

The dummy beam splitter 13 is supposed to be fixed. The first dummy mirror 14 is mounted on a single-axis translation stage 24. A micrometric adjustment screw 34 enables adjusting a position of the first dummy mirror 14 along the beam path relatively to the translation stage 24. A sensor detects a rotation of the adjustment screw 34, which is transferred to a computer system and converted into a numerical longitudinal displacement of the first mirror.

The second dummy mirror 15 is mounted on a dual-axis tilt stage 25. Two micrometric adjustment screws 35a, 35b enable adjusting two transverse tilt angles of the second dummy mirror 15 relatively to the tilt stage 25. Sensors detect rotation(s) of the adjustment screw(s) 35a, respectively 35b, which are transferred to the computer system and converted into two numerical tilt angle variations of the second mirror.

Preferably, the adjustment screws 34, respectively 35a, 35b related to the translation stage 24, respectively tilt stage 25, are similar to those used in conventional Michelson interferometer so as to provide sensitive position adjustment with a micrometric or sub-micrometric precision (500 micrometer displacement per one turn for example).

Preferably, the sensors are placed close to the respective adjustment screws 34, 35a, 35b or even embedded with each adjustment screw 34, respectively 35a, 35b so as to detect precise signals representative of an action of the operator on each adjustment screw 34, respectively 35a, 35b.

The dummy lens 16 is mounted on a single-axis translation stage 26 (see FIG. 3), for example using a conventional carrier mount. An operator translates the dummy lens 16 by grasping the dummy lens 16 and sliding it along the translation stage 26. The translation stage 26 is equipped with a sensor 46, for example an electric or optical encoder, for detecting the longitudinal position of the dummy lens 16 on the translation stage 26. The sensor is mounted directly on the translation stage 26, so as to enable detection of a precise longitudinal position signal. An electronic board 80 receives the signal detected by the sensor 46 and converts this signal into a measured longitudinal position of the dummy lens 16. The electronic board 80 communicates this measured longitudinal position to the computer system.

For example, the electronic board 80 is an Arduino board comprising a microcontroller, analog inputs, digital input/output pins, a USB connection and a power jack. It contains everything needed to support the microcontroller, by simply connecting it to the computer system with a USB cable. The electronic board 80 receives analog or digital signals from the sensor(s) of the adjustment screws 34, 35a, 35b, and of the translation stage 26. Preferably, the electronic board 80 is configured to convert these input signals into numerical output signals representing numerical longitudinal displacements of the translation stage 24 or of the dummy lens 16, respectively representing numerical tilt angle variations, of the adjustment screws 35a and 35b. The numerical output signals are transferred to the computer system via a USB cable for example.

As illustrated on FIG. 2, the dummy lens 16 and translation stage 26 are placed on a table 3, whereas the dummy beam splitter 13 and dummy mirrors 14, 15 are placed on another surface 4 for compensating the difference in height between the dummy lens 16 and other dummy components 13, 14, 15. Thus, the hybrid simulator simulates beam propagation in a horizontal plane. As an option, all the dummy components can be placed on the same table surface and dummy deflection mirrors can be inserted in order to compensate the different heights and simulate beam propagation in 3D.

In this second embodiment, the computer system 90 comprises a numerical model simulating a Michelson interferometer optical setup.

More precisely, in this second embodiment, the numerical model comprises a numerical light source defined by its spectrum, numerical aperture and, optionally, polarization state. The numerical model also comprises:
- a numerical beam splitter oriented at a fixed numerical angle and represented by the dummy beam splitter 13;
- a first numerical mirror having a numerically adjustable longitudinal position, represented by the first dummy mirror 14 attached to the translation stage 24;
- a second numerical mirror having two numerically adjustable transverse tilt angles, represented by the dummy mirror 15 attached to the tilt stage 25,
- a numerical lens having a longitudinally adjustable position represented by the dummy lens 16 attached to the translation stage 26; and
- a numerical projection screen represented by the physical screen 2.

The position and orientation of the numerical light source, numerical beam-splitter, first and second numerical mirrors, numerical lens and numerical projection screen are initialized. Here, the positions of the numerical light source, numerical beam splitter and numerical projection screen are supposed to be fixed. Hence, the numerical model monitors simultaneously:
- the longitudinal position of the first dummy mirror 14 measured by a sensor on the translation stage 24 or on the adjustment screw 34;
- the two transverse tilt angles of the second dummy mirror 15 measured by sensors on the tilt stage 25 or on the adjustment screws 35a, 35b;
- the longitudinal position of the dummy lens 16 measured by the optical encoder 46 on the translation stage 26.

The numerical model simulates emission of a numerical source light beam by the numerical light source directed toward the numerical beam splitter, separation of the source light beam in a first and a second divided light beams, reflection of the first divided light beam on the first numerical mirror, reflection of the second divided light beam on the second numerical mirror, recombination of the first and second reflected light beam on the numerical beam splitter thus forming a numerical interfering light beam, optical imaging of the numerical interfering light beam through the numerical lens on the numerical screen for forming a numerical interference pattern.

A video-projector (not represented) projects the numerical interference pattern 50 on the screen 2 (see FIG. 4).

Depending on the longitudinal position of the dummy lens 16 relatively to the screen 2, the numerical model represents interference rings (when the numerical screen is in the focal plane of the numerical lens) or interference linear fringes (when the numerical screen is in the conjugate plane of the numerical mirrors).

The operator adjusts the longitudinal position of the translation stage 24 attached to the first dummy mirror 14 by turning the adjustment screw 34. Similarly, the operator adjusts one or the two transverse tilt angles of the second dummy mirror 15, by turning the corresponding micrometric adjustment screws 35a, 35b. Finally, the operator adjusts the longitudinal position of the dummy lens 16 by grasping the dummy lens 16 and sliding it along the translation stage 26. These adjustments can be performed according to different sequence orders.

The computer system calculates a numerical interference pattern as a function, on the one hand, of the initial position and orientation of each dummy optical component, and, on the other hand, as a function of the measured longitudinal position and tilt angles of the first and second dummy mirrors 14, 15 and as a function of the measured longitudinal position of the dummy lens 16.

A video-projector projects a real image 50 representing this numerical interference pattern on the physical screen 2. The spatial intensity distribution of the image 50 projected on the screen is updated dynamically as a function of the measured longitudinal position and tilt angles of the first and second dummy mirrors 14, 15, and as a function of the position of the dummy lens 16.

Thus, the operator visualizes dynamically the interference pattern 50 as a function of the real longitudinal position and tilt angles applied to the dummy mirrors 14, respectively 15, attached to the translation stage 24, respectively tilt stage 25, and as a function of the real longitudinal position of the dummy lens 16 mounted on the translation stage 26. The hybrid simulator simulating a Michelson interferometer is adjusted when the numerical beam paths of the first arm and second arm of the interferometer present a numerical phase difference that is lower than the coherence length of the numerical light source. When the dummy Michelson interferometer is correctly adjusted, the operator 1 experiences tactile and visual feedback sensations which are very similar to those of a Michelson interferometer experiment relying on true optical components.

As an option, for more experienced students, the first and second dummy mirrors could be mounted on translation stages, so as to teach two additional adjustment degrees.

Figure 5:
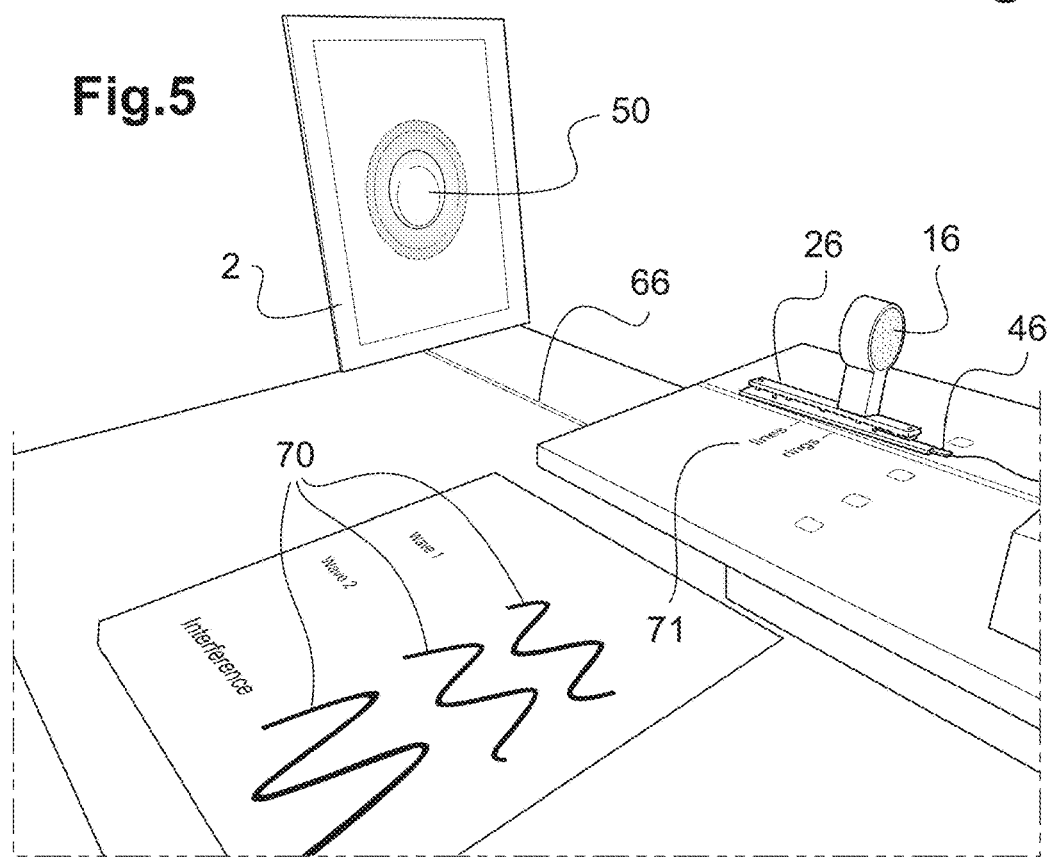
FIG. 5 illustrates a variant of the second embodiment of hybrid simulator.

As an option, FIG. 5 represents a variant wherein the numerical model comprises an additional module for displaying tutorial informations 70. For example, the computer computes dynamically the shape of a first wave propagating on the first arm of the numerical Michelson interferometer, a second wave propagating on the second arm of the numerical Michelson interferometer, and the shape of the interferences at the output of the numerical beam splitter (see projections 70 on FIG. 5).

As another option, a video-projector may display other type of tutorial informations such as an approximated longitudinal position 71 of the dummy lens 16 corresponding to imaging conditions. This information enables the operator to reach rapidly the corresponding position or to switch easily from interference rings to interference linear fringes.

In another example, the video-projector displays numerical informations 72 on the cardboard surface 4. The numerical informations 72 (0.003353 mm, preferably rounded to a micron unit as 0.003 mm) displayed adjacent to the dummy mirror 14 represent the numerical signal derived from the sensor measurement of the adjustment screw 34: this signal represents in the example the distance expressed in mm from the first numerical mirror relatively to its neutral position in the Michelson interferometer. Similarly, the numerical informations 72 displayed adjacent to the dummy mirror 15 (X: −0.000122; Y: 0.000082) represent the numerical signals derived from the sensor measurements of the adjustment screw 35a respectively 35b. Additionally, the numerical information 72 (45) displayed adjacent to the dummy beam splitter 13 represents a numerical signal of the angle of incidence of the numerical beam on the beam splitter either derived from input in the numerical model or from a measurement of the orientation of the dummy beam splitter 13.

These informations 72 are updated dynamically as a function of the adjustment screws and as a function of the position of the lens 16 on the translation stage 26. Thus, the operator receives visual numerical feedback corresponding to a dummy detector measuring the corresponding value.

The informations displayed may also represent for example a phase shift between the optical beam path of the first and second arms in the Michelson interferometer represented by the dummy components.

Other types of informations may also be displayed such as the orientation of a mirror or the technical specifications of a lens.

The tutorial informations 70, 71, 72 may be displayed simultaneously. Alternatively, the tutorial informations 70, 71 are displayed one by one according to a predetermined sequence configured by the teacher or trainer.

The Michelson interferometer dummy layout can easily be adapted for changing the light source, for adding or replacing a dummy optical component by another dummy optical component.

Similarly as in the first embodiment, a camera system for tracking in 3D the respective positions and orientations of the different dummy optical components may be combined for providing additional information to the numerical simulation system.

The invention applies to the field of education for teaching students how to align optical, opto-mechanical and/or optoelectronics components.

The invention also applies to the field manufacturing complex optical or optoelectronics systems such as lasers, spectroscopes, microscopes for training operators to adjustment of optical devices, such as optical alignment. The actions learned are easily transferred to the mounting and alignment of real systems.

Variants

Sensor(s) can be connected to the computer system 90 by a wired connection or through a wireless communication network.

Within the present disclosure different types of actuators are considered for interacting with the hybrid simulator.

A first type of actuator comprises a physical actuator acting directly on a dummy optical component such as a translation or a rotation stage physically modifying the actual position or orientation of a dummy optical component. An example of such a type of actuator is illustrated by the translation stage 26 for translating the lens 26 on FIG. 3. In this case, the sensor may detect a real displacement of the dummy optical component. This first type of actuator may be equipped with precision adjustment screw; in this case the sensor may detect a signal of the adjustment screw or measure the actual displacement of the dummy optical component. Alternatively, this first type of actuator may be driven by a motor or by a controller; in this case the sensor may detect a signal derived from the motor or from the controller or measure the actual displacement of the dummy optical component. A calibration procedure enables to convert the detected signal into a measured variation in position and/or angular orientation of the dummy optical component.

A second type of actuator comprises a physical actuator but that does not act directly on the dummy optical component but simulates an action on the dummy optical component. An example of this second type of actuator is given by the adjustment screw 30 which actually rotates around an axis but which does not modify the real position or orientation of the dummy mirror 10. In this case, the adjustment screw 30 simulates a rotation of the dummy mirror 10, and the sensor detects a signal of the adjustment screw 30 simulating an adjustment of the dummy optical component. For example, the actuator includes an embedded sensor detecting the movement of the actuator. In the case of this second type of actuator, the sensor does not measure any real effect on the dummy optical component. In this case, the sensor measures a signal derived from the actuator or from a controller.

More generally, the adjustment of an optical component encompasses any type of adjustment, including adjusting and controlling the temperature of a non-linear crystal or adjusting and controlling the diode current for pumping a laser. This variant enables controlling some components driven electrically or electronically such as optical modulators, motorized stages . . . . In this case, the operator induces for example a variation of the position, orientation, temperature, voltage of a dummy optical component using a computer interface driving an electronic controller. A sensor detects a signal representative of said variation of in position, orientation, temperature, voltage at the output of the electronic controller.

This second type of actuator may be controlled by an electronic interface or through the interface of the computer system. For example, a motorized actuator controls virtually the position of a dummy optical component. However, in any case a real sensor measures a physical signal representative of operating said actuator.

As an option, each dummy optical component is uniquely associated with a single numerical optical component, corresponding to an optical transfer function registered in a database connected to the simulation system. This database can be updated by different users, or even be connected to databases of optical components from known suppliers. Preferably in this case, each dummy component comprises an identification tag enabling easy identification of the associated numerical optical transfer function, and easy construction of the optical simulation.

Preferably, the hybrid simulator comprises a numerical library of resource materials and design models.

Process

Figure 6:
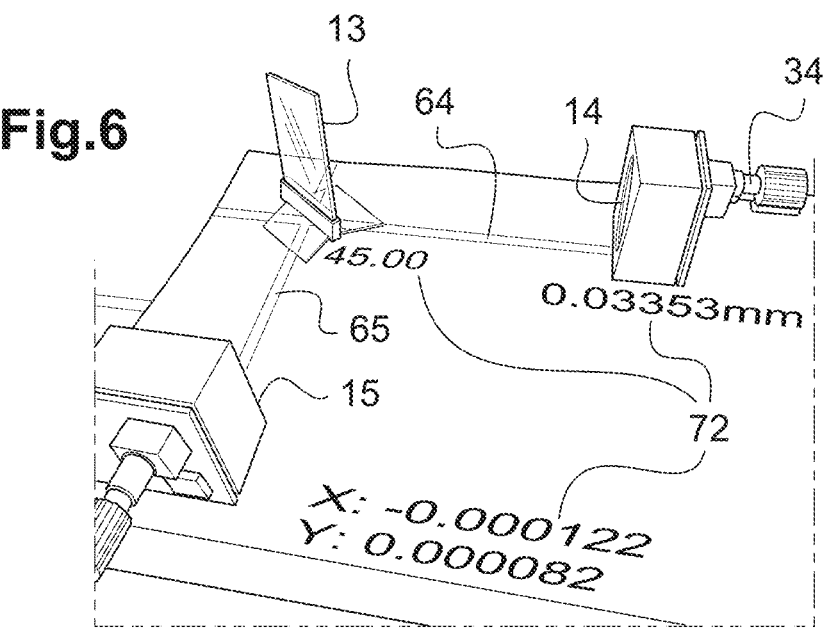
FIG. 6 illustrates another variant of the second embodiment of hybrid simulator.
Figure 7:
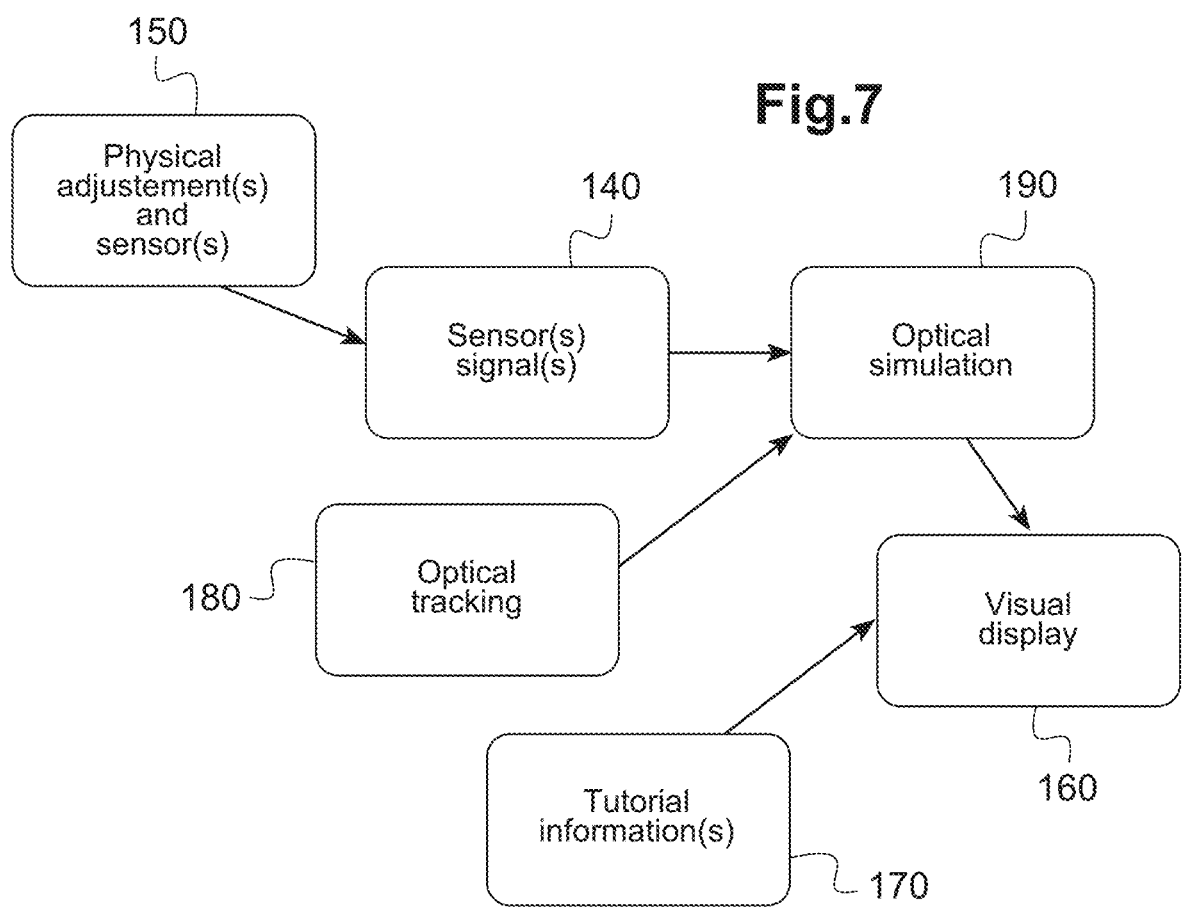
FIG. 7 represents a schematic view of the different modules of a hybrid simulator.

FIG. 6 schematically represents the architecture of the hybrid simulator. The hybrid simulator can be proposed in a basic configuration, or the basic configuration may be proposed with one or several options.

The basic modules are: a physical adjustment and sensor module 150, sensor(s) signal(s) module 140, an optical simulation module 190 and a display module 160. The physical adjustment and sensor module 150 collects raw data from the sensor(s) and provides these raw data to the sensor(s) signal(s) module 140. The sensor(s) signal(s) module 140 transforms the raw data into calibrated signals used in the optical simulation module 190. The optical simulation module 190 computes the numerical optical simulation as a function of the sensors signals, and calculates a simulation of an optical signal representative of optical beam propagation in the hybrid simulator. The display module 160 displays visual signal(s) representative of the calculated simulation.

The hybrid simulator comprises, as a first option, an optical tracking module 180, for tracking position and orientation of the dummy optical components in 3D.

The hybrid simulator comprises, as another option, a tutorial information module 170, for displaying additional tutorial informations.

Those skilled in the art will recognize that the invention applies to numerous optical layouts.

The process is modular, easily configurable and adaptable to modify easily a determined optical configuration or to many different optical configurations.

The numerical model used for optical simulation can easily be interfaced with many existing optical design and simulation tools.

The invention claimed is:

1. Hybrid simulator for teaching optics or for training adjustment of an optical device,
    wherein the hybrid simulator comprises:
        at least one dummy optical component physically simulating an optical device;
        at least one actuator device for generating or simulating an adjustment of said dummy optical component;
        a sensor configured for detecting an adjustment signal representative of operating said actuator device;
        a digital processing system receiving said adjustment signal from said sensor, said digital processing system comprising a numerical model for simulating at least an output numerical optical beam resulting from interaction between an input numerical optical beam and a numerical optical component representing said optical device as a function of said adjustment signal;
        a display system for displaying a visual signal representative of said output numerical optical beam as a function of said adjustment signal.

2. Hybrid simulator for teaching optics or for training adjustment of an optical device according to claim 1 wherein said actuator device comprises a translation and/or rotation stage attached to said dummy optical component for translating and/or rotating said dummy optical component, and wherein said sensor is configured for detecting a translation and/or rotation signal of said translation and/or rotation stage.

3. Hybrid simulator for teaching optics or for training adjustment of an optical device according to claim 2 wherein said actuator device comprises an adjustment screw for simulating a translation and/or rotation of said dummy optical component, and wherein said sensor is configured for detecting a translation and/or rotation signal of said adjustment screw.

4. Hybrid simulator for teaching optics or for training adjustment of an optical device according to claim 2, wherein said actuator device comprises an electric, electronic, opto-mechanic or optoelectronic actuator for generating or simulating an electric, electronic, opto-mechanic or optoelectronic adjustment of said dummy optical component and wherein said sensor is configured for detecting an adjustment signal of said electric, electronic, opto-mechanic or optoelectronic actuator.

5. Hybrid simulator for teaching optics or for training adjustment of an optical device according to claim 1 wherein said actuator device comprises an adjustment screw for simulating a translation and/or rotation of said dummy optical component, and wherein said sensor is configured for detecting a translation and/or rotation signal of said adjustment screw (30).

6. Hybrid simulator for teaching optics or for training adjustment of an optical device according to claim 5, wherein said actuator device comprises an electric, electronic, opto-mechanic or optoelectronic actuator for generating or simulating an electric, electronic, opto-mechanic or optoelectronic adjustment of said dummy optical component and wherein said sensor is configured for detecting an adjustment signal of said electric, electronic, opto-mechanic or optoelectronic actuator.

7. Hybrid simulator for teaching optics or for training adjustment of an optical device according to claim 1, wherein said actuator device comprises an electric, electronic, opto-mechanic or optoelectronic actuator for generating or simulating an electric, electronic, opto-mechanic or optoelectronic adjustment of said dummy optical component and wherein said sensor is configured for detecting an adjustment signal of said electric, electronic, opto-mechanic or optoelectronic actuator.

8. Hybrid simulator for teaching optics or for training adjustment of an optical device according to claim 1, wherein said actuator device is configured for generating or simulating an adjustment in temperature and/or pressure of said dummy optical component and wherein said sensor (46) is configured for detecting a temperature and/or pressure adjustment signal.

9. Hybrid simulator for teaching optics or for training adjustment of an optical device according to claim 1 wherein said display system comprises a video-projector, an electronic screen or a tablet for displaying said visual signal representative of said output numerical optical beam as a function of said adjustment signal representative of operating said actuator device.

10. Hybrid simulator for teaching optics or for training adjustment of an optical device according to claim 9 wherein said digital processing system and said display system are configured for displaying augmented reality.

11. Hybrid simulator for teaching optics or for training adjustment of an optical device according to claim 9 further comprising another video-projector, another computer screen or another tablet for displaying augmented reality signals comprising a visual optical beam path simulating said input numerical optical beam and/or said output numerical optical beam relatively to said dummy optical component and/or visual guiding signals.

12. Hybrid simulator for teaching optics or for training adjustment of an optical device according to claim 11 wherein said numerical optical component represents an optical component chosen among: convergent and divergent lenses; plane, convex and concave mirrors; thin polarizers birefringent polarizing prisms; beam-splitters; wave-plates; spatial filters; spectral filters; optical gain media amplitude and phase modulators; acousto-optic and electro-optic crystals and nonlinear optical crystals.

13. Hybrid simulator for teaching optics or for training adjustment of an optical device according to claim 1 wherein said digital processing system and said display system are configured for displaying augmented reality signals.

14. Hybrid simulator for teaching optics or for training adjustment of an optical device according to claim 1 wherein said numerical optical component represents an optical component chosen among: convergent and divergent lenses; plane, convex and concave mirrors; thin polarizers birefringent polarizing prisms; beam-splitters; wave-plates; spatial filters; spectral filters; optical gain media amplitude and phase modulators; acousto-optic and electro-optic crystals and nonlinear optical crystals.

15. Hybrid simulator for teaching optics or for training adjustment of an optical device according to claim 1 further comprising a numerical database of numerical optical components enabling simulation of a plurality of optical devices and/or optical systems.

16. Hybrid simulator for teaching optics or for training adjustment of an optical device according to claim 15 comprising a plurality of dummy optical components physically simulating a plurality of optical devices, each dummy optical component having an identification tag, and wherein each identification tag is associated with a determined numerical optical component in the numerical database.

17. Hybrid simulator for teaching optics or for training adjustment of an optical device according to claim 1 wherein said numerical model comprises beam propagation modeling according to a numerical model based on any one or a combination of geometrical optics, physical optics including scalar and vector models, laser physics, Gaussian beam propagation, and nonlinear optics.

18. Method for teaching optics or for training adjustment of an optical device, the method comprising the steps of:
  placing at least one dummy optical component in an initial configuration in a hybrid simulator, said dummy optical component physically simulating an optical device;
  physically adjusting at least one actuator device so as to generate or simulate an adjustment of said dummy optical component;
  detecting an adjustment signal representative of operating said actuator device;
  transmitting said adjustment signal to a digital processing system;
  numerically simulating an output numerical optical beam resulting from interaction between an input numerical optical beam and a numerical optical component representing said optical device as a function of said adjustment signal;
  displaying a visual signal representative of said output numerical optical beam as a function of said adjustment signal.

19. Method for teaching optics or for training adjustment of an optical device according to claim 18 further comprising the steps of:
  Providing a database of optical transfer functions associated with numerical optical components, wherein each dummy optical component is associated with an optical transfer function stored in said database; and
  Providing an identification tag attached to a dummy component, said identification tag being associated with a determined transfer function stored in said database.

20. Method for teaching optics or for training adjustment of an optical device according to claim 18 further comprising a step of displaying augmented reality signals.

\* \* \* \* \*